US012798115B2

(12) United States Patent
Shimizu

(10) Patent No.: US 12,798,115 B2
(45) Date of Patent: Nov. 17, 2026

(54) SUBSTRATE HOLDING HAND AND SUBSTRATE CONVEYING ROBOT

(71) Applicant: KAWASAKI JUKOGYO KABUSHIKI KAISHA, Kobe (JP)

(72) Inventor: Ippei Shimizu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 930 days.

(21) Appl. No.: 18/024,419

(22) PCT Filed: Nov. 2, 2020

(86) PCT No.: PCT/JP2020/041030
§ 371 (c)(1),
(2) Date: Mar. 2, 2023

(87) PCT Pub. No.: WO2022/049787
PCT Pub. Date: Mar. 10, 2022

(65) Prior Publication Data
US 2023/0311339 A1 Oct. 5, 2023

(30) Foreign Application Priority Data
Sep. 3, 2020 (JP) ................................ 2020-148494

(51) Int. Cl.
*B25J 15/00* (2006.01)
*B25J 11/00* (2006.01)

(52) U.S. Cl.
CPC ....... *B25J 15/0004* (2013.01); *B25J 11/0095* (2013.01); *B25J 15/0014* (2013.01); *B25J 15/009* (2013.01)

(58) Field of Classification Search
CPC ......................... B25J 15/0004; B25J 11/0095; B25J 15/0014; B25J 15/0052; H10P 72/30; H10P 72/3402; H10P 72/7602
See application file for complete search history.

(56) References Cited

U.S. PATENT DOCUMENTS 6,216,883 B1 * 4/2001 Kobayashi .......... H10P 72/7602 211/41.18
10,090,188 B2 * 10/2018 Thanu ................. H10P 72/7602
2010/0068014 A1 3/2010 Mitsuyoshi et al.
2014/0377044 A1 12/2014 Mitsuyoshi et al.
2017/0069517 A1 3/2017 Goto et al.
2017/0323821 A1 11/2017 Thanu et al.
2018/0104827 A1 * 4/2018 Goto .................... B25J 15/0014
2018/0151399 A1 5/2018 Goto et al.
(Continued)

FOREIGN PATENT DOCUMENTS

JP H11-165863 A 6/1999
JP 2010-67871 A 3/2010
JP 2013-69914 A 4/2013
(Continued)

*Primary Examiner* — Catherine Loikith
(74) *Attorney, Agent, or Firm* — Oliff PLC

(57) ABSTRACT

A substrate holding hand includes a frame, a blade to support a substrate, a mounting member to support the blade and mount the blade to the frame, and an inclination adjusting mechanism operable to adjust an inclination of the blade with respect to a horizontal direction in a side view by adjusting an inclination of the mounting member with respect to the frame.

7 Claims, 5 Drawing Sheets

(56) References Cited

U.S. PATENT DOCUMENTS

2020/0024726 A1 1/2020 Moradian et al.

FOREIGN PATENT DOCUMENTS

| | | | |
|---|---|---|---|
| JP | 2019-519913 | A | 7/2019 |
| TW | 201939653 | A | 10/2019 |
| TW | 202017093 | A | 5/2020 |
| WO | 2017/037976 | A1 | 3/2017 |

* cited by examiner

SUBSTRATE HOLDING HAND AND SUBSTRATE CONVEYING ROBOT

TECHNICAL FIELD

The present invention relates to a substrate holding hand and a substrate conveying robot, and relates to a substrate holding hand and a substrate conveying robot each including a blade to support a substrate.

BACKGROUND ART

Conventionally, a substrate holding hand including a blade to support a substrate is known. Such a hand is disclosed in Japanese Patent Laid-Open No. 2013-069914, for example.

Japanese Patent Laid-Open No. 2013-069914 discloses a substrate conveying hands (substrate holding hand) to convey substrates. These substrate conveying hands include hand main bodies (blades) that support the substrates. These substrate conveying hands support the substrates stored in a substrate storage container compatible with a SEMI (Semiconductor Equipment and Materials International) standard FOUP (Front Opening Unified Pod) by the hand main bodies and convey the substrates, for example.

Although not clearly described in Japanese Patent Laid-Open No. 2013-069914, in a conventional substrate storage container as described in Japanese Patent Laid-Open No. 2013-069914, substrates are stored such that they are parallel to a horizontal direction in a side view. In this case, in a conventional substrate conveying hand as described in Japanese Patent Laid-Open No. 2013-069914, hand main bodies are provided parallel to a horizontal direction in a side view so as to correspond to substrates stored in a substrate storage container.

PRIOR ART

Patent Document

Patent Document 1: Japanese Patent Laid-Open No. 2013-069914

SUMMARY OF THE INVENTION

Problems to be Solved by the Invention

In the conventional substrate conveying hand, it is difficult to adjust the inclinations of the hand main bodies (blades) that support the substrates with respect to the horizontal direction in the side view according to the inclinations of the substrates with respect to the horizontal direction when the substrates stored in the substrate storage container (storage container) are inclined with respect to the horizontal direction in the side view.

The present invention aims to provide a substrate holding hand and a substrate conveying robot each capable of easily adjusting the inclination of a blade that supports a substrate with respect to a horizontal direction in a side view according to the inclination of the substrate with respect to the horizontal direction even when the substrate stored in a storage container is inclined with respect to the horizontal direction in the side view.

Means for Solving the Problems

A substrate holding hand according to a first aspect of the present invention includes a frame, a blade to support a substrate, a mounting member to support the blade and mount the blade to the frame, and an inclination adjusting mechanism operable to adjust an inclination of the blade with respect to a horizontal direction in a side view by adjusting an inclination of the mounting member with respect to the frame.

A substrate conveying robot according to a second aspect of the present invention includes a substrate holding hand and an arm to move the substrate holding hand. The substrate holding hand includes a frame, a blade to support a substrate, a mounting member to support the blade and mount the blade to the frame, and an inclination adjusting mechanism operable to adjust an inclination of the blade with respect to a horizontal direction in a side view by adjusting an inclination of the mounting member with respect to the frame.

Effect of the Invention

According to the present invention, as described above, the inclination adjusting mechanism is provided to adjust the inclination of the blade with respect to the horizontal direction in the side view by adjusting the inclination of the mounting member with respect to the frame such that even when a substrate stored in the storage container (such as a hoop) is inclined with respect to the horizontal direction in the side view, the inclination of the blade that supports the substrate with respect to the horizontal direction in the side view can be easily adjusted according to the inclination of the substrate with respect to the horizontal direction. Furthermore, even when the substrate stored in the storage container is inclined with respect to the horizontal direction in the side view due to the inclination of the storage container itself, the inclination of the blade that supports the substrate with respect to the horizontal direction in the side view can be easily adjusted according to the inclination of the substrate with respect to the horizontal direction. Moreover, even when the blade bends due to the blade's own weight and the weight of the substrate held by the blade, for example, and is inclined with respect to the horizontal direction in the side view, the inclination of the blade that supports the substrate with respect to the horizontal direction in the side view can be easily adjusted according to the inclination of the substrate with respect to the horizontal direction.

MODES FOR CARRYING OUT THE INVENTION

An embodiment embodying the present invention is hereinafter described on the basis of the drawings.

The configuration of a substrate conveying robot 100 according to this embodiment is now described with reference to FIGS. 1 to 5.

Figure 1:
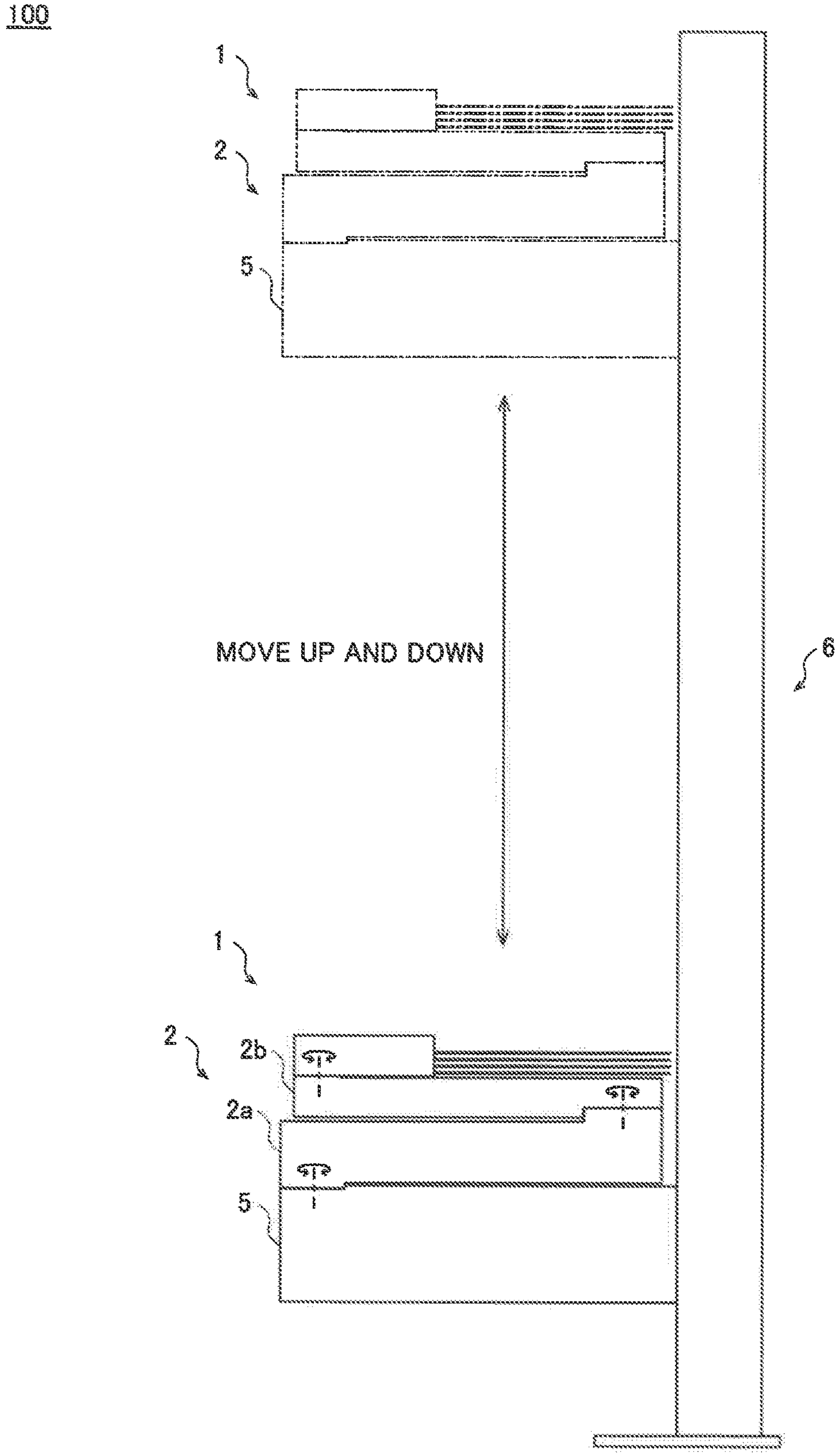
FIG. 1 is a diagram showing the configuration of a substrate conveying robot according to an embodiment of the present invention.

As shown in FIG. 1, the substrate conveying robot 100 includes a substrate holding hand 1 and an arm 2 that moves the substrate holding hand 1. As shown in FIGS. 2 to 5, the substrate holding hand 1 includes a frame 31, blades 32 that support substrates (semiconductor wafers) W, mounting members 33 that support the blades 32 and mount the blades 32 to the frame 31, and inclination adjusting mechanisms 34 to adjust the inclinations of the blades 32 with respect to a horizontal direction in a side view by adjusting the inclinations of the mounting members 33 with respect to the frame 31.

According to this embodiment, as described above, the inclination adjusting mechanisms 34 are provided to adjust the inclinations of the blades 32 with respect to the horizontal direction in the side view by adjusting the inclinations of the mounting members 33 with respect to the frame 31 such that even when the substrates W stored in a storage container (such as a hoop) are inclined with respect to the horizontal direction in the side view, the inclinations of the blades 32 that support the substrates W with respect to the horizontal direction in the side view can be easily adjusted according to the inclinations of the substrates W with respect to the horizontal direction. Furthermore, even when the substrates W stored in the storage container are inclined with respect to the horizontal direction in the side view due to the inclination of the storage container itself, the inclinations of the blades 32 that support the substrates W with respect to the horizontal direction in the side view can be easily adjusted according to the inclinations of the substrates W with respect to the horizontal direction. Moreover, even when the blades 32 bend due to the blades 32' own weights and the weights of the substrates W held by the blades 32, for example, and are inclined with respect to the horizontal direction in the side view, the inclinations of the blades 32 that support the substrates W with respect to the horizontal direction in the side view can be easily adjusted according to the inclinations of the substrates W with respect to the horizontal direction.

The substrate holding hand 1 includes the frame 31, the blades 32, the mounting members 33, and the inclination adjusting mechanisms 34, as shown in FIGS. 2 to 5.

Figure 3:
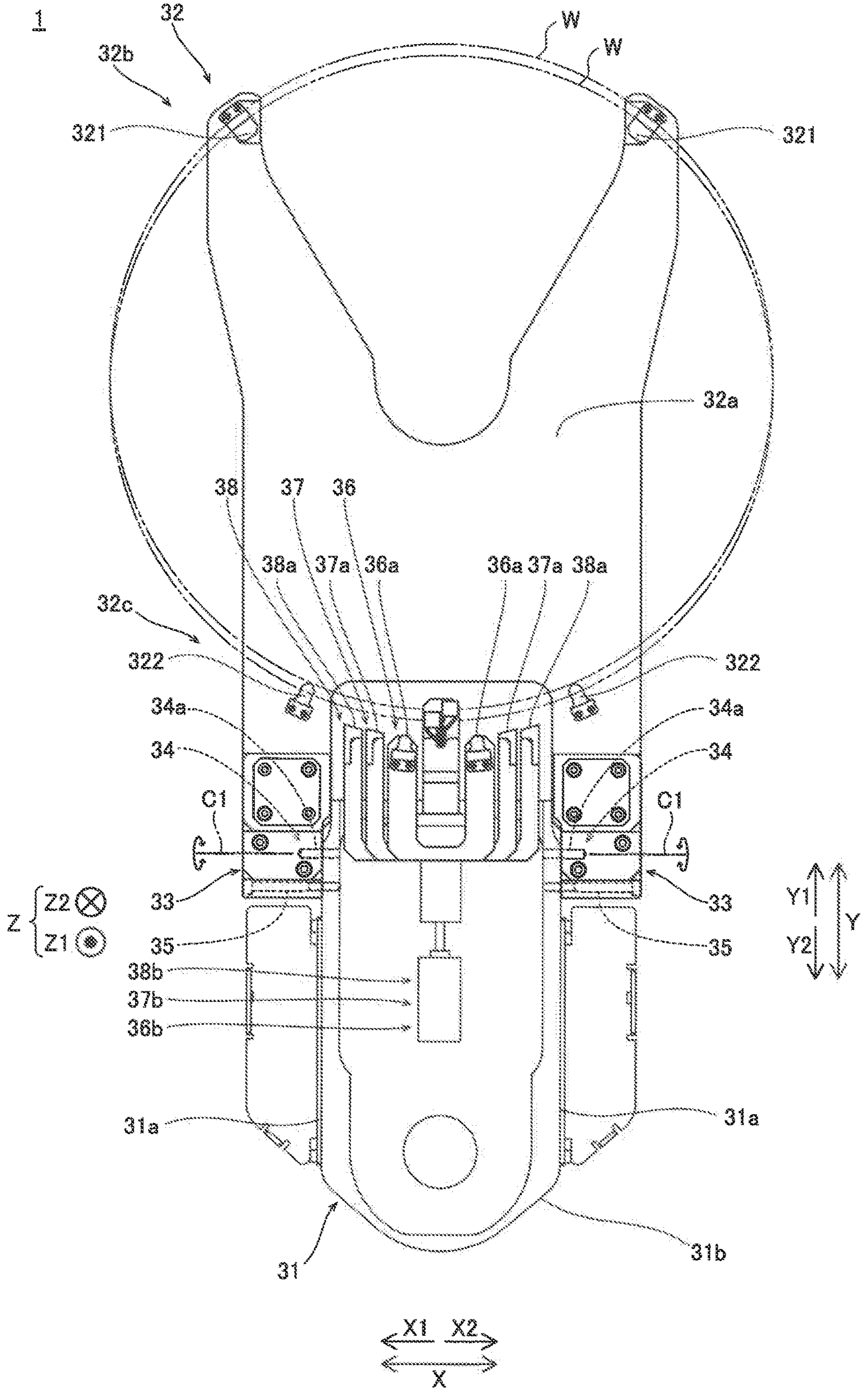
FIG. 3 is a plan view showing the configuration of the substrate holding hand according to the embodiment of the present invention.
Figure 4:
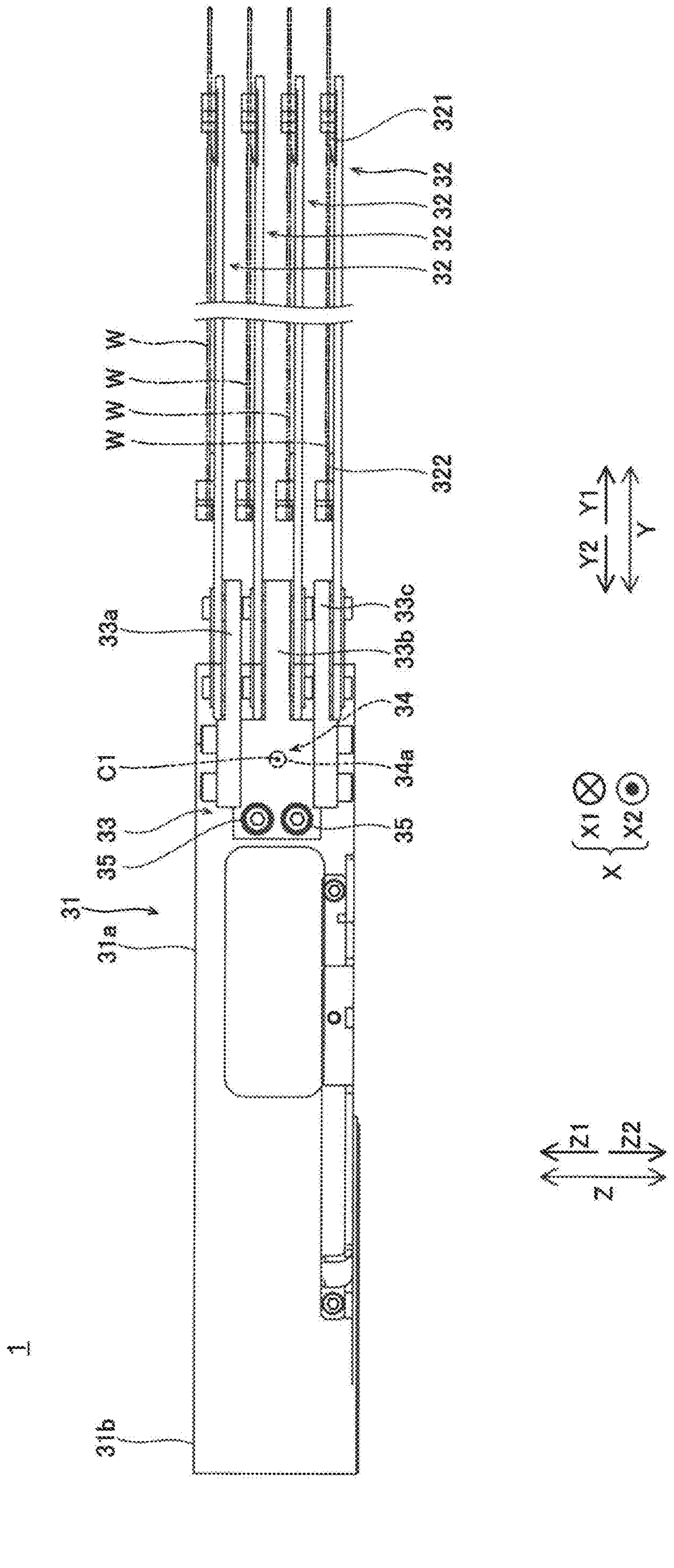
FIG. 4 is a side view showing the configuration of the substrate holding hand according to the embodiment of the present invention.
Figure 5:
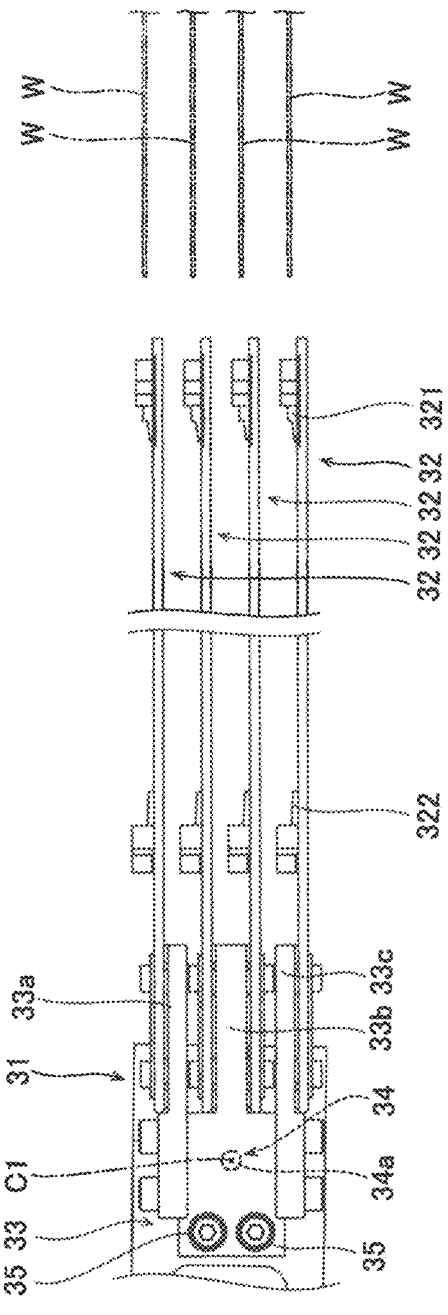
FIG. 5 is a diagram for illustrating adjustment of the inclinations of blades according to the embodiment of the present invention.

As shown in FIGS. 3 to 5, the inclination adjusting mechanisms 34 include inclination adjusting pins 34*a*. The inclination adjusting pins 34*a* are inserted into the mounting members 33, support the mounting members 33 such that the mounting members 33 are rotatable about predetermined rotation axes C1 extending in a lateral direction (X direction) perpendicular to a forward-rearward direction (Y direction) in which the frame 31 and the blades 32 are aligned in the horizontal direction, and extend in the lateral direction (X direction). FIG. 5 shows adjustment of the inclinations of the blades 32 in an exaggerated manner for easy understanding.

The mounting members 33 include a pair of mounting members 33 that mount a first side and a second side of a base end 32*c* of each of the blades 32 to the frame 31, respectively. The inclination adjusting pins 34*a* include a pair of inclination adjusting pins 34*a* corresponding to the pair of mounting members 33. The inclination adjusting mechanisms 34 can adjust the inclinations of the blades 32 with respect to the horizontal direction in the side view by rotating the pair of mounting members 33 about the predetermined rotation axes C1 with the pair of inclination adjusting pins 34*a* as the center of rotation.

The inclination adjusting pins 34*a* are supported by the frame 31 and protrude from the side of the frame 31 so as to be inserted into the mounting members 33.

The inclination adjusting mechanisms 34 can adjust the inclinations of the blades 32 with respect to the horizontal direction in the side view by fastening and fixing the mounting members 33 to the frame 31 with fastening members 35 in a state in which the inclinations of the mounting members 33 have been adjusted by rotating the mounting members 33 about the predetermined rotation axes C1 with the inclination adjusting pins 34*a* as the center of rotation. The fastening members 35 extend parallel to the predetermined rotation axes C1, and are mounted laterally (in the X direction) to the frame 31 via the mounting members 33.

The blades 32 include a plurality of (four) blades 32 that support the substrates W, respectively. The mounting members 33 support the plurality of blades 32 in common. The inclination adjusting mechanisms 34 can collectively adjust the inclinations of the plurality of blades 32 with respect to the horizontal direction in the side view by adjusting the inclinations of the mounting members with respect to the frame 31.

The plurality of blades 32 are aligned at a predetermined pitch in a direction (Z direction) perpendicular to the main surfaces 32*a* of the blades 32. The inclination adjusting mechanisms 34 can collectively adjust the inclinations of the plurality of blades 32 with respect to the horizontal direction in the side view while maintaining the pitch between the plurality of blades 32 in the direction (Z direction) perpendicular to the main surfaces 32*a* of the blades 32.

The mounting members 33 are laterally attached to the side surfaces of the frame 31.

As shown in FIG. 1, the arm 2 is a horizontal articulated robot arm. The arm 2 includes a first arm 2*a* and a second arm 2*b*. The first arm 2*a* is rotatable with respect to a base 5, which is described below, with a first end as the center of rotation. Specifically, the first end of the first arm 2*a* is rotatably connected to the base 5 via a first joint. The second arm 2*b* is rotatable with respect to the first arm 2*a* with a first end as the center of rotation. Specifically, the first end of the second arm 2*b* is rotatably connected to a second end of the first arm 2*a* via a second joint. The substrate holding hand 1 is rotatably connected to a second end of the second arm 2*b* via a third joint. A drive mechanism including a servomotor corresponding to a drive source for rotary drive, a rotational position sensor that detects the rotational position of an output shaft of the servomotor, and a power transmission mechanism that transmits the output of the servomotor to the joint is provided at each of the first joint, the second joint, and the third joint.

The substrate conveying robot 100 further includes the base 5 to which the arm 2 is attached, and an arm elevating mechanism 6 to which the base 5 is attached. A first end of the base 5 is connected to the first end of the first arm 2*a*, and a second end of the base 5 is connected to the arm elevating mechanism 6. The arm elevating mechanism 6 moves the arm 2 up and down by moving the base 5 up and down. The arm elevating mechanism 6 includes a servomotor corresponding to a drive source for up-down drive, a rotational position sensor that detects the rotational position of an output shaft of the servomotor, and a power transmission mechanism that transmits the output of the servomotor to the base 5 (arm 2).

Figure 2:
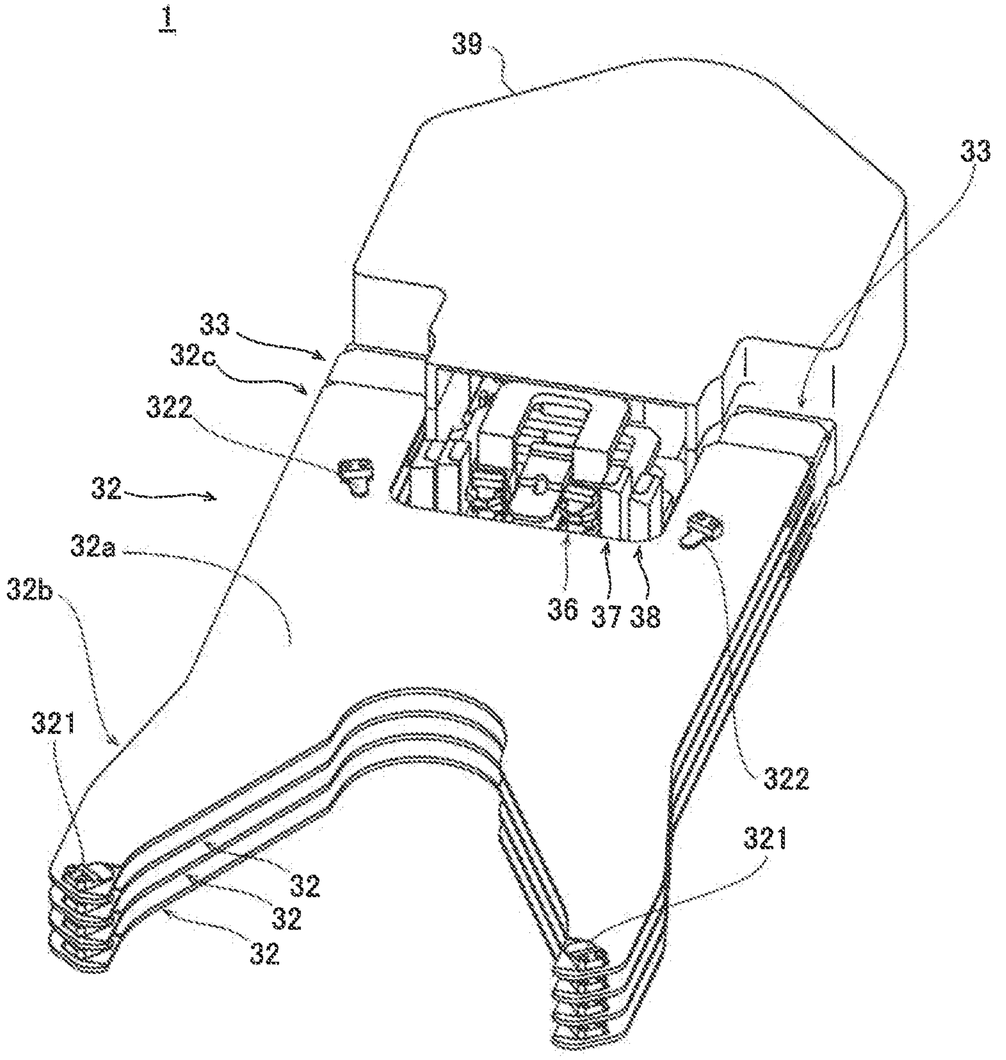
FIG. 2 is a perspective view showing the configuration of a substrate holding hand according to the embodiment of the present invention.

As shown in FIG. 2, the substrate holding hand 1 includes the plurality of (four) blades 32. That is, the substrate holding hand 1 can convey (hold) a plurality of (four) substrates W.

As shown in FIGS. 2 and 3, the substrate holding hand 1 includes the frame 31, the blades 32, and the mounting members 33. The frame 31 is a support that supports the blades 32. The frame 31 includes a pair of side walls 31*a* and a base end 31*b* connecting the pair of side walls 31*a*. The pair of side walls 31*a* are spaced apart from each other such that the wall surfaces thereof face each other in a direction (X direction) parallel to a direction in which a pair of front supports 321 are aligned. The pair of side walls 31*a* extend in a direction (Y direction) perpendicular to the direction in which the pair of front supports 321 are aligned and parallel to the main surfaces 32*a* of the blades 32. The base end 31*b* connects base ends (portions on the Y2 direction side) of the pair of side walls 31*a*. The base end 31*b* has a shape that is convexly curved toward the base end side (the Y2 direction side). The pair of side walls 31*a* and the base end 31*b* are provided in a U-shape, as viewed in the direction perpendicular to the main surfaces 32*a* of the blades 32.

The blades 32 are thin support plates that support the substrates W. Each of the blades 32 includes the front supports 321 on the tip end 32*b* side (Y1 direction side) and rear supports 322 on the base end 32*c* side (Y2 direction side). The blade 32 has a shape in which the tip end 32*b* side is bifurcated. In the blade 32, the pair of front supports 321 are distributed to the bifurcated portions. The pair of front supports 321 each have a plurality of (two) support surfaces at different heights. A pair of rear supports 322 each have a support surface at a height substantially the same as the heights of the lower (Z2 direction side) support surfaces of the pair of front supports 321. The "height" refers to a distance from the main surfaces 32*a* of the blades 32 in the direction (Z direction) perpendicular to the main surfaces 32*a* of the blades 32.

The pair of front supports 321 and the pair of rear supports 322 are provided on the main surface 32*a* of each blade 32. The support surfaces of the pair of front supports 321 and the pair of rear supports 322 support the rear surface (the surface on the Z2 direction side) of the outer peripheral edge of a substantially circular substrate W from below.

The mounting members 33 are laterally attached to the side walls 31*a* of the frame 31. Specifically, the mounting member 33 on the X1 direction side is attached to a tip end-side portion of the side wall 31*a* on the X1 direction side of the frame 31 from the outer side (X1 direction side). The mounting member 33 on the X1 direction side is fixed to the tip end-side portion of the side wall 31*a* on the X1 direction side of the frame 31 by the fastening member 35 on the X1 direction side. The mounting member 33 on the X2 direction side is attached to a tip end-side portion of the side wall 31*a* on the X2 direction side of the frame 31 from the outer side (X2 direction side). The mounting member 33 on the X2 direction side is fixed to the tip end-side portion of the side wall 31*a* on the X2 direction side of the frame 31 by the fastening member 35 on the X2 direction side. The fastening members 35 are inserted into the mounting members 33 in the X direction and fastened to fastening holes of the side walls 31*a* of the frame 31.

As shown in FIGS. 4 and 5, the mounting members 33 each include plate-shaped supports 33*a*, 33*b*, and 33*c* that support the blades 32. The supports 33*a*, 33*b*, and 33*c* are aligned in the direction (Z direction) perpendicular to the main surfaces 31*c* of the blades 32. The supports 33*a*, 33*b*, and 33*c* extend from the frame 31 side (Y2 direction side) toward the tip ends 32*b* (Y1 direction side) of the blades 32. The support 33*a* supports the upper (Z1 direction side) end blade (first stage blade) 32 on the upper surface side. The support 33*b* supports the intermediate blades (second stage and third stage blades) 32 in common. The support 33*b* supports the blades 32 on the upper surface side and the lower surface side, respectively. The support 33*c* supports the lower (Z2 direction side) end blade (fourth stage blade) 32 on the lower surface side.

When the inclinations are adjusted by the inclination adjusting mechanisms 34, the mounting members 33 are rotated about the rotation axes C1 with the inclination adjusting pins 34*a* as the center of rotation while the fastening members 35 are loosened. Thus, the plurality of blades 32 supported by the supports 33*a*, 33*b*, and 33*c* of the mounting members 33 are rotated about the rotation axes C1 while the pitch between the plurality of blades 32 is maintained. Consequently, the inclinations of the plurality of blades 32 with respect to the horizontal direction in the side view are collectively adjusted. Furthermore, the inclinations of the plurality of blades 32 with respect to the horizontal direction in the side view are fixed by tightening the fastening members 35.

The substrate holding hand 1 further includes a movable support unit 36 that moves back and forth to support the substrates W, and a first movable pressing unit 37 and a second movable pressing unit 38 that move back and forth to press the substrates W. The movable support unit 36 includes pairs of support members 36*a* that support the substrates W, and an air cylinder 36*b* corresponding to an actuator that moves the pairs of support members 36*a* back and forth in the Y direction. In the movable support unit 36, the pairs of support members 36*a* can be moved forward in the Y1 direction by the air cylinder 36*b* to be placed at support positions at which the pairs of support members 36*a* support the substrates W. Furthermore, in the movable support unit 36, the pairs of support members 36*a* can be moved backward in the Y2 direction by the air cylinder 36*b* to be placed at retracted positions at which the pairs of support members 36*a* do not support the substrates W. The pairs of support members 36*a* have support surfaces at heights substantially the same as the heights of the upper (Z1 direction side) support surfaces of pairs of front supports 321. Each support surface of the pairs of support members 36*a* supports the rear surface (the surface on the Z2 direction side) of the outer peripheral edge of the substantially circular substrate W from below.

The first movable pressing unit 37 includes a pair of pressing members 37*a* that press the substrates W, and an air cylinder 37*b* corresponding to an actuator that moves the pair of pressing members 37*a* back and forth in the Y direction. In the first movable pressing unit 37, the pair of pressing members 37*a* can be moved forward in the Y1 direction by the air cylinder 37*b* to press the substrates W. Furthermore, in the first movable pressing unit 37, the pair of pressing members 37*a* can be moved backward in the Y2 direction by the air cylinder 37*b* to be placed at retracted positions at which the pair of pressing members 37*a* do not press the substrates W.

The second movable pressing unit 38 includes a pair of pressing members 38*a* that press the substrates W, and an air cylinder 38*b* corresponding to an actuator that moves the pair of pressing members 38*a* back and forth in the Y direction. In the second movable pressing unit 38, the pair of pressing members 38*a* can be moved forward in the Y1 direction by the air cylinder 38*b* to press the substrates W. Furthermore, in the second movable pressing unit 38, the pair of pressing members 38*a* can be moved backward in the Y2 direction by the air cylinder 38*b* to be placed at retracted positions at which the pair of pressing members 38*a* do not press the substrates W.

In the substrate holding hand 1, the upper (Z1 direction side) support surfaces of the pairs of front supports 321 and the support surfaces of the pairs of support members 36*a* of the movable support unit 36 support the processed (washed) substrates W. The pair of pressing members 37*a* of the first movable pressing unit 37 press the processed (washed) substrates W supported by the upper (Z1 direction side) support surfaces of the pairs of front supports 321 and the support surfaces of the pairs of support members 36*a* of the movable support unit 36.

In the substrate holding hand 1, the lower (Z2 direction side) support surfaces of the pairs of front supports 321 and the support surfaces of pairs of rear supports 322 support the substrates W prior to processing (washing). The pair of pressing members 38*a* of the second movable pressing unit 38 press the substrates W prior to processing (washing) supported by the lower (Z2 direction side) support surfaces of the pairs of front supports 321 and the support surfaces of the pairs of rear supports 322. The pairs of front supports 321, the pairs of rear supports 322, the movable support unit 36, the first movable pressing unit 37, and the second movable pressing unit 38 are used properly for the substrates W prior to processing (washing) and the processed (washed) substrates W.

The air cylinder 36*b* of the movable support unit 36, the air cylinder 37*b* of the first movable pressing unit 37, and the air cylinder 38*b* of the second movable pressing unit 38 are arranged as a frame inner component 40*a* on the inside of the frame 31. The air cylinder 36*b* of the movable support unit 36, the air cylinder 37*b* of the first movable pressing unit 37, and the air cylinder 38*b* of the second movable pressing unit 38 are aligned in the direction (Z direction) perpendicular to the main surfaces 32*a* of the blades 32 on the inside of the frame 31. Specifically, the air cylinder 36*b* of the movable support unit 36, the air cylinder 37*b* of the first movable pressing unit 37, and the air cylinder 38*b* of the second movable pressing unit 38 overlap each other, as viewed in the direction (Z direction) perpendicular to the main surfaces 32*a* of the blades 32. Therefore, the air cylinders 36*b*, 37*b*, and 38*b* are not aligned in the width direction (X direction) of the frame 31, and thus the air cylinders 36*b*, 37*b*, and 38*b* can be compactly arranged in the width direction (X direction) of the frame 31.

The substrate holding hand 1 further includes a cover (casing) 39 (see FIG. 2) separately from the frame 31. The cover 39 covers the frame 31 and portions (portions arranged on the inside of the frame 31) of the movable support unit 36, the first movable pressing unit 37, and the second movable pressing unit 38.

Advantages of this Embodiment

According to this embodiment, the following advantages are achieved.

According to this embodiment, as described above, the inclination adjusting mechanisms 34 are provided to adjust the inclinations of the blades 32 with respect to the horizontal direction in the side view by adjusting the inclinations of the mounting members 33 with respect to the frame 31 such that even when the substrates W stored in the storage container (such as a hoop) are inclined with respect to the horizontal direction in the side view, the inclinations of the blades 32 that support the substrates W with respect to the horizontal direction in the side view can be easily adjusted according to the inclinations of the substrates W with respect to the horizontal direction. Furthermore, even when the substrates W stored in the storage container are inclined with respect to the horizontal direction in the side view due to the inclination of the storage container itself, the inclinations of the blades 32 that support the substrates W with respect to the horizontal direction in the side view can be easily adjusted according to the inclinations of the substrates W with respect to the horizontal direction. Moreover, even when the blades 32 bend due to the blades 32' own weights and the weights of the substrates W held by the blades 32, for example, and are inclined with respect to the horizontal direction in the side view, the inclinations of the blades 32 that support the substrates W with respect to the horizontal direction in the side view can be easily adjusted according to the inclinations of the substrates W with respect to the horizontal direction.

According to this embodiment, as described above, the inclination adjusting mechanisms 34 include the inclination adjusting pins 34*a*. The inclination adjusting pins 34*a* are inserted into the mounting members 33, support the mounting members 33 such that the mounting members 33 are rotatable about the predetermined rotation axes C1 extending in the lateral direction perpendicular to the forward-rearward direction in which the frame 31 and the blades 32 are aligned in the horizontal direction, and extend in the lateral direction. Accordingly, the mounting members 33 can be easily and reliably rotated about the predetermined rotation axes C1 extending in the lateral direction with the inclination adjusting pins 34*a* as the center of rotation, and thus the inclinations of the blades 22 with respect to the horizontal direction in the side view can be easily and reliably adjusted by the inclination adjusting mechanisms 34 including the inclination adjusting pins 34*a*.

According to this embodiment, as described above, the mounting members 33 include the pair of mounting members 33 to mount the first side and the second side of the base end 32*c* of each of the blades 32 to the frame 31, respectively. The inclination adjusting pins 34*a* include the pair of inclination adjusting pins 34*a* corresponding to the pair of mounting members 33. The inclination adjusting mechanisms 34 are operable to adjust the inclinations of the blades 32 with respect to the horizontal direction in the side view by rotating the pair of mounting members 33 about the predetermined rotation axes C1 extending in the lateral direction with the pair of inclination adjusting pins 34*a* as the center of rotation. Accordingly, the pair of mounting members 33 can be more easily and reliably rotated about the predetermined rotation axes C1 using the pair of inclination adjusting pins 34*a*, and thus the inclinations of the blades 22 with respect to the horizontal direction in the side view can be more easily and reliably adjusted by the inclination adjusting mechanisms 34 including the pair of inclination adjusting pins 34*a*.

According to this embodiment, as described above, the inclination adjusting pins 34*a* are supported by the frame 31 and protrude from the side of the frame 31 so as to be inserted into the mounting members 33. Accordingly, the mounting members 33 can be rotated about the predetermined rotation axes C1 by the inclination adjusting pins 34*a* firmly supported by the frame 31. Consequently, the inclinations of the blades 32 with respect to the horizontal direction in the side view can be easily adjusted.

According to this embodiment, as described above, the inclination adjusting mechanisms 34 are operable to adjust the inclinations of the blades 32 with respect to the horizontal direction in the side view by fastening and fixing the mounting members 33 to the frame 31 with the fastening members 35 in a state in which the inclinations of the mounting members 33 have been adjusted by rotating the mounting members 33 about the predetermined rotation axes C1 with the inclination adjusting pins 34*a* as the center of rotation. Accordingly, the inclinations of the blades 32 with respect to the horizontal direction in the side view can be fixed to adjusted inclinations only by fastening and fixing the mounting members 33 to the frame 31 with the fastening members 35, and thus the inclinations of the blades 32 with respect to the horizontal direction in the side view can be easily adjusted.

According to this embodiment, as described above, the blades 32 include the plurality of blades 32 to support the substrates W, respectively. The mounting members 33 support the plurality of blades 32 in common. The inclination adjusting mechanisms 34 are operable to collectively adjust the inclinations of the plurality of blades 32 with respect to the horizontal direction in the side view by adjusting the inclinations of the mounting members 33 with respect to the frame 31. Accordingly, as compared with a case in which it is necessary to individually adjust the inclinations of the plurality of blades 32 with respect to the horizontal direction in the side view, it is possible to save time and effort in adjusting the inclinations of the plurality of blades 32 with respect to the horizontal direction in the side view, and thus the inclinations of the plurality of blades 32 with respect to the horizontal direction in the side view can be easily adjusted.

According to this embodiment, as described above, the plurality of blades 32 are aligned at the predetermined pitch in the direction perpendicular to the main surfaces 32*a* of the blades 32. The inclination adjusting mechanisms 34 are operable to collectively adjust the inclinations of the plurality of blades 32 with respect to the horizontal direction in the side view while maintaining the pitch between the plurality of blades 32 in the direction perpendicular to the main surfaces 32*a* of the blades 32. Accordingly, it is not necessary to adjust the pitch between the plurality of blades 32 (a distance between the centers of the blades 32) after the inclinations of the plurality of blades 32 with respect to the horizontal direction in the side view are adjusted, and thus the inclinations of the blades 32 with respect to the horizontal direction in the side view can be more easily adjusted.

According to this embodiment, as described above, the mounting members 33 are laterally attached to the side surface of the frame 31. Accordingly, as compared with a case in which the mounting members 33 are attached to the frame 31 from above or below, the inclinations of the mounting members 33 with respect to the horizontal direction in the side view can be easily adjusted from the side, and thus adjustment of the inclinations of the blades 32 with respect to the horizontal direction in the side view by adjustment of the inclinations of the mounting members 33 can be easily performed.

MODIFIED EXAMPLES

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the example in which the arm is a horizontal articulated robot arm has been shown in the aforementioned embodiment, the present invention is not limited to this. For example, the arm may be an arm other than a horizontal articulated robot arm, such as a vertical articulated robot arm.

While the example in which the substrate holding hand includes a plurality of blades has been shown in the aforementioned embodiment, the present invention is not limited to this. For example, the substrate holding hand may include one blade.

While the example in which the substrate holding hand includes four blades has been shown in the aforementioned embodiment, the present invention is not limited to this. For example, the substrate holding hand may include a plurality of blades other than four.

While the example in which each of the blades has a bifurcated shape has been shown in the aforementioned embodiment, the present invention is not limited to this. For example, each of the blades may have a shape other than a bifurcated shape.

While the example in which each of the blades can support two substrates at different heights has been shown in the aforementioned embodiment, the present invention is not limited to this. For example, each of the blades may be able to support only one substrate (able to support a substrate at only one height).

While the example in which the movable support unit is provided has been shown in the aforementioned embodiment, the present invention is not limited to this. For example, the movable support unit may not be provided.

While the example in which the movable support unit includes a pair of support members for one substrate has been shown in the aforementioned embodiment, the present invention is not limited to this. For example, the movable support unit may include one support member for one substrate.

While the example in which two pressing units, which are the first movable pressing unit and the second movable pressing unit, are provided has been shown in the aforementioned embodiment, the present invention is not limited to this. For example, only one movable pressing unit may be provided.

While the example in which each of the movable pressing units includes a pair of pressing members has been shown in the aforementioned embodiment, the present invention is not limited to this. For example, each of the movable pressing units may include one pressing member.

While the example in which the inclination adjusting mechanisms include the inclination adjusting pins has been shown in the aforementioned embodiment, the present invention is not limited to this. For example, the inclination adjusting mechanisms may include inclination adjusting structures such as inclination adjusting screws other than the inclination adjusting pins.

While the example in which the inclination adjusting mechanisms can collectively adjust the inclinations of the plurality of blades with respect to the horizontal direction in the side view has been shown in the aforementioned embodiment, the present invention is not limited to this. In the present invention, the inclination adjusting mechanisms may be able to individually adjust the inclinations of the plurality of blades with respect to the horizontal direction in the side view. Alternatively, the inclination adjusting mechanisms may be able to collectively adjust the inclinations of some of the plurality of blades with respect to the horizontal direction in the side view.

DESCRIPTION OF REFERENCE NUMERALS

1: substrate holding hand
2: arm
31: frame
32: blade
32*a*: main surface
33: mounting member
34: inclination adjusting mechanism
34*a*: inclination adjusting pin
35: fastening member
100: substrate conveying robot
W: substrate
C1: predetermined rotation axis

The invention claimed is:

1. A substrate holding hand comprising:
a frame;
a blade to support a substrate;
a pair of mounting members to support the blade and mount a first side and a second side of a base end of the blade to the frame, respectively; and
an inclination adjusting mechanism operable to adjust an inclination of the blade with respect to a horizontal direction in a side view by adjusting inclinations of the mounting members with respect to the frame, wherein;
the inclination adjusting mechanism includes a pair of inclination adjusting pins corresponding to the pair of mounting members;
the inclination adjusting pins are inserted into the mounting members, support the mounting members such that the mounting members are rotatable about a predetermined rotation axis extending in a lateral direction perpendicular to a forward-rearward direction in which the frame and the blade are aligned in the horizontal direction, and extend in the lateral direction; and
the inclination adjusting mechanism is operable to adjust the inclination of the blade with respect to the horizontal direction in the side view by rotating the pair of mounting members about the predetermined rotation axis with the pair of inclination adjusting pins as a center of rotation.

2. The substrate holding hand according to claim 1, wherein the inclination adjusting pins are supported by the frame and protrude from a side of the frame so as to be inserted into the mounting members.

3. The substrate holding hand according to claim 1, wherein
the blade includes a plurality of blades each to support the substrate;
the mounting members support the plurality of blades in common; and
the inclination adjusting mechanism is operable to collectively adjust inclinations of the plurality of blades with respect to the horizontal direction in the side view by adjusting the inclinations of the mounting members with respect to the frame.

4. The substrate holding hand according to claim 3, wherein
the plurality of blades are aligned at a predetermined pitch in a direction perpendicular to main surfaces of the blades; and
the inclination adjusting mechanism is operable to collectively adjust the inclinations of the plurality of blades with respect to the horizontal direction in the side view while maintaining the pitch between the plurality of blades in the direction perpendicular to the main surfaces of the blades.

5. The substrate holding hand according to claim 1, wherein the mounting members are laterally attached to a side surface of the frame.

6. A substrate bolding hand comprising:
a frame,
a blade to support a substrate;
a mounting member to support the blade and mount the blade to the frame; and
an inclination adjusting mechanism operable to adjust an inclination of the blade with respect to a horizontal direction in a side view by adjusting an inclination of the mounting member with respect to the frame, wherein:
the inclination adjusting mechanism includes an inclination adjusting pin;
the inclination adjusting pin is inserted into the mounting member, supports the mounting member such that the mounting member is rotatable about a predetermined rotation axis extending in a lateral direction perpendicular to a forward-rearward direction in which the frame and the blade are aligned in the horizontal direction, and extends in the lateral direction; and
the inclination adjusting mechanism is operable to adjust the inclination of the blade with respect to the horizontal direction in the side view by fastening and fixing the mounting member to the frame with a fastening member in a state in which the inclination of the mounting member has been adjusted by rotating the mounting member about the predetermined rotation axis with the inclination adjusting pin as a center of rotation.

7. A substrate conveying robot comprising:
a substrate holding hand; and
an arm to move the substrate holding hand, wherein;
the substrate holding hand includes:
a frame;
a blade to support a substrate;
a pair of mounting members to support the blade and mount a first side and a second side of a base end of the blade to the frame respectively; and
an inclination adjusting mechanism operable to adjust an inclination of the blade with respect to a horizontal direction in a side view by adjusting inclinations of the mounting members with respect to the frame;
the inclination adjusting mechanism includes a pair of inclination adjusting pins corresponding to the pair of mounting members;
the inclination adjusting pins are inserted into the mounting members, support the mounting members such that the mounting members are rotatable about a predetermined rotation axis extending in a lateral direction perpendicular to a forward-rearward direction in which the frame and the blade are aligned in the horizontal direction, and extend in the lateral direction; and
the inclination adjusting mechanism is operable to adjust the inclination of the blade with respect to the horizontal direction in the side view by rotating the pair of mounting members about the predetermined rotation axis with the pair of inclination adjusting pins as a center of rotation.

* * * * *